(12) United States Patent
Cheriyadat et al.

(10) Patent No.: US 10,878,278 B1
(45) Date of Patent: Dec. 29, 2020

(54) GEO-LOCALIZATION BASED ON REMOTELY SENSED VISUAL FEATURES

(71) Applicant: STURFEE, INC., Sunnyvale, CA (US)

(72) Inventors: Anil Cheriyadat, Knoxville, TN (US);
Brent McFerrin, Plano, TX (US);
Harini Sridharan, San Jose, CA (US);
Dilip Patlolla, Fremont, CA (US)

(73) Assignee: STURFEE, INC., Sunnyvale, CA (US)

( * ) Notice: Subject to any disclaimer, the term of this patent is extended or adjusted under 35 U.S.C. 154(b) by 186 days.

(21) Appl. No.: 15/944,766

(22) Filed: Apr. 3, 2018

Related U.S. Application Data

(63) Continuation-in-part of application No. 15/155,867, filed on May 16, 2016, now Pat. No. 10,108,882.

(60) Provisional application No. 62/162,677, filed on May 16, 2015.

(51) Int. Cl.
| | | |
|---|---|---|
| *G06K 9/62* | (2006.01) | |
| *G06K 9/20* | (2006.01) | |
| *G06T 19/20* | (2011.01) | |
| *G06T 15/20* | (2011.01) | |
| *G06T 19/00* | (2011.01) | |
| *G06F 16/29* | (2019.01) | |
| *G06F 16/58* | (2019.01) | |

(52) U.S. Cl.
CPC ......... *G06K 9/6206* (2013.01); *G06F 16/29* (2019.01); *G06F 16/5866* (2019.01); *G06K 9/209* (2013.01); *G06T 15/205* (2013.01); *G06T 19/003* (2013.01); *G06T 19/20* (2013.01); *G06T 2200/04* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 7,190,371 | B2 * | 3/2007 | Palm | H04N 19/597 345/582 |
| 8,094,944 | B2 * | 1/2012 | Simon | G06T 7/80 345/420 |
| 8,422,825 | B1 * | 4/2013 | Neophytou | G06F 3/14 382/294 |

(Continued)

FOREIGN PATENT DOCUMENTS

JP 6092012 B2 * 3/2017

OTHER PUBLICATIONS

English Translation of JP 6092012 B2 (Year: 2013).*

(Continued)

*Primary Examiner* — Michelle M Entezari
(74) *Attorney, Agent, or Firm* — Rimon Law

(57) ABSTRACT

Visual data is used to locate a device in the real world. The location and orientation of the device is detected by matching the camera view of the device to a computer-generated view of an area surrounding the location. The computer-generated view of the area is constructed by combining various remotely sensed geospatial data including satellite imagery, aerial LIDAR, map data, GIS inventory data, and/or the like. In various embodiments, the disclosed system can not only locate the device but can also provide measurements regarding where the user is looking and 3D measurement of the scene in the device camera view. In various embodiments, the presented invention enables devices to have a system that provides spatial intelligence to any camera.

26 Claims, 7 Drawing Sheets

(56) References Cited

U.S. PATENT DOCUMENTS

| | | | | |
|---|---|---|---|---|
| 9,129,429 | B2* | 9/2015 | Hammond | G06T 11/60 |
| 9,324,151 | B2* | 4/2016 | Snavely | G06K 9/00664 |
| 9,489,635 | B1* | 11/2016 | Zhu | G06K 9/00805 |
| 9,563,201 | B1* | 2/2017 | Tofte | B64C 39/024 |
| 9,911,228 | B2* | 3/2018 | Pershing | G06T 17/20 |
| 10,089,784 | B2* | 10/2018 | Bognar | G01B 11/24 |
| 10,679,372 | B2* | 6/2020 | Sheffield | G06F 30/13 |
| 2012/0121161 | A1* | 5/2012 | Eade | G09B 29/007 |
| | | | | 382/153 |
| 2013/0148851 | A1* | 6/2013 | Leung | G06K 9/3241 |
| | | | | 382/103 |
| 2013/0321593 | A1* | 12/2013 | Kirk | H04N 13/257 |
| | | | | 348/51 |
| 2015/0016712 | A1* | 1/2015 | Rhoads | G06K 9/00208 |
| | | | | 382/154 |
| 2015/0094089 | A1* | 4/2015 | Moeglein | G01S 5/16 |
| | | | | 455/456.1 |

OTHER PUBLICATIONS

Pulli, K., Hoppe, H., Cohen, M., Shapiro, L., Duchamp, T., & Stuetzle, W. (1997). View-based rendering: Visualizing real objects from scanned range and color data. In Rendering techniques' 97 (pp. 23-34). Springer, Vienna. (Year: 1997).*

Coupe, S. N., Thacker, N. A., & Bromiley, P. A. (2008). A methodology for constructing view-dependent wireframe models. (Year: 2008).*

* cited by examiner

GEO-LOCALIZATION BASED ON REMOTELY SENSED VISUAL FEATURES

CROSS-REFERENCE TO RELATED APPLICATIONS

This application is a continuation-in part of U.S. patent application Ser. No. 15/155,867 filed May 16, 2016, which in turn claims the benefit of U.S. provisional patent application Ser. No. 62/162,677, filed on May 16, 2015. The disclosures of the above patent applications are hereby incorporated herein by reference.

BACKGROUND

Field of the Invention

The invention is in the field of geo-localization, for example, locating camera connected device location and gaze in the world based on matching remotely sensed visual features of the location with the features detected on camera's view.

Related Art

Current location based applications use GPS sensors to measure the location of the device. The location measurement is used by applications to retrieve contextual place information, reviews, and recommendations. However, GPS based location information is insufficient for applications in the area of augmented reality where digital information is overlaid on images of the physical world, and the area of autonomous devices where machines need to interpret the local surroundings for operational purposes. Such applications and devices need accurate information regarding where the device is located, what the device is looking towards, and what is around the device.

SUMMARY OF INVENTION

In various embodiments, the invention provides systems and methods that enable devices and applications to have location and orientation measurements from visual data, for example pictures and videos.

In various embodiments, the invention provides systems and methods that enable camera connected devices and applications to interpret local surroundings through visual data.

In various embodiments, the invention provides systems and methods that enable devices and applications to detect 3D geometry of the physical world from pictures and videos.

In various embodiments, the invention provides systems and methods that enable devices and applications to measure user's gaze target or where the user is looking towards through the camera view In various embodiments, the invention provides systems and methods that enable users to access information about places in a picture or video directly through a click on the image or video.

In various embodiments, the invention provides systems and methods that enable users to access information about places directly through a camera view In various embodiments, the invention provides systems and methods that enable users to locate places in a picture or video on the map.

Various embodiments of the invention include methods of precisely measure geo-location information, for example latitude, longitude, and/or altitude of physical world objects through pictures.

Various embodiments of the invention include methods of mapping pixel coordinates of places (e.g. stores, restaurants, hotels, offices) on the picture or video frame to coordinates (latitude, longitude, and/or altitude) on a map.

Various embodiments of the invention include software configured to enable a user to access business information about places depicted in the picture simply by clicking on the picture or video frame. For example, the user can input place information directly through a picture in a viewfinder to update the information in a place database. The information can be in the form of both text and/or multimedia.

Various embodiments of the invention provide videos or pictures through which user can interact to get additional business-related information.

Various embodiments of the invention include business information posted and accessed by the user could be diverse ranging from store information, restaurant menus, business reviews, user experiences, personal notes, history, news events, or user generated content.

Various embodiments of the invention include a location system comprising: an I/O configured to receive a camera image from a mobile client, the camera image being generated using a camera; signature storage configured to store a plurality of simulated image signatures, each of the simulated image signatures being associated with a location and a viewpoint; signature generation logic configured to generate an image signature of the camera image; matching logic configured to determine a location of the camera within an area by comparing the image signature of the camera image to the plurality of simulated image signatures; and a processor configured to execute at least the signature generation logic.

Various embodiments of the invention include a method determining a location, the method comprising: receiving location information representative of a location of a mobile device; receiving a camera image from the mobile device; selecting a set of simulated image signatures based on the location information, each of the simulated image signatures being associated with a location; generating an camera image signature of the camera image; comparing the camera image signature with the set of simulated image signatures, to determine a best matching simulated image signature; and assuming the location of the mobile device to be the location associated with the best matching simulated image signature.

Various embodiments of the invention include a method of augmenting an image, the method comprising: generating a plurality of simulated images, each of the simulated images being associated with a different location; generating a simulated image signature for each of the simulated images; receiving a location a mobile device; receiving an image generated by the mobile device; generating an camera image signature of the received image; selecting a subset of the simulated image signatures based on the received location of the mobile device; comparing the camera image signature to each simulated image signature of the subset, to find a best matching simulated image signature; assuming that the location associated with the best matching simulated image signature is the location of the mobile device; refining the assumed location by comparing the received image to one or more simulated images; and augmenting the received image based on the refined location.

DETAILED DESCRIPTION

In various embodiments, methods described here enable devices to achieve location measurements more precise and/or accurate than those typically provided today by traditional GPS signal sources, particularly in cities. The presented methods use remotely sensed visual cues measured from overhead images (satellite, aerial LIDAR) to determine the location and orientation of a camera-connected device in the world and provides 3D measurements of the local surroundings in the camera's view. Embodiments of the presented inventions gives users with a system that provides spatial intelligence to any camera. For example, the presented system can be (i) integrated to smartphone cameras enabling users to post and access place information directly through the camera view; (ii) integrated to smartphone cameras to overlay computer generated graphics on the camera view of the physical world; (iii) integrated to wearable cameras enabling user to post and access place information directly through gaze and gestures; and/or (iv) integrated to cameras on autonomous devices enabling them to measure their location, orientation, and distance to local surroundings.

Various methods presented here enables users to post and access information about places directly through pictures and videos taken by cameras. Such a camera can be integrated with a smartphone, tablet, or similar device, but can also be, for example, a digital camera having a microprocessor, a touchscreen, and hardware to support a connection to a network like a cellular network or a Wi-Fi access point. These methods recognize places such as local businesses, restaurants, retail stores, and other points-of-interest in a picture taken with the camera then enables the user to add or access information to places directly through pictures or videos. This provides improvements over existing solutions that require the user to identify the place on a map.

Figure 1:
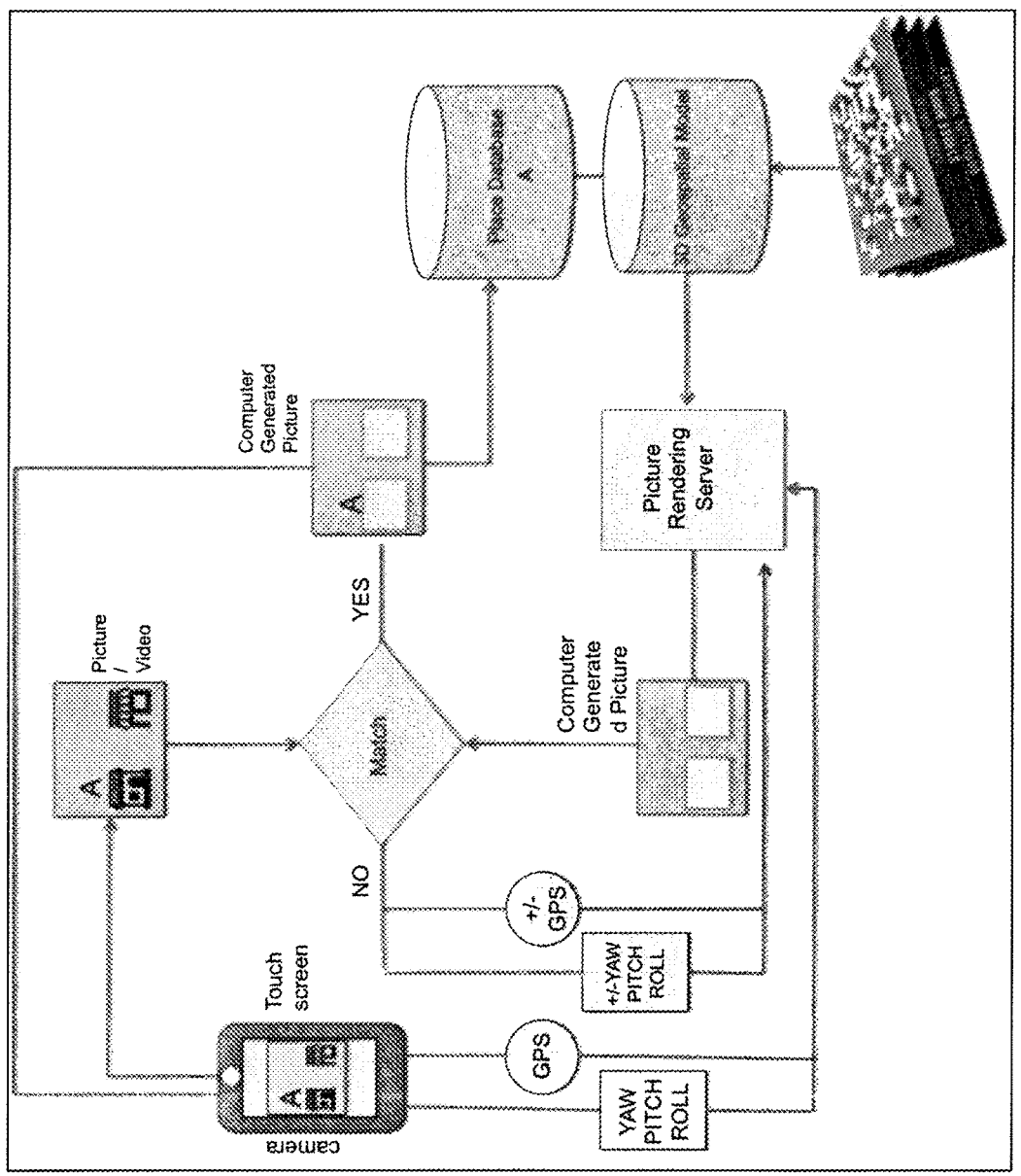
FIG. 1 shows a system and method to access place information through pictures according to an exemplary embodiment of the invention.
Figure 2:
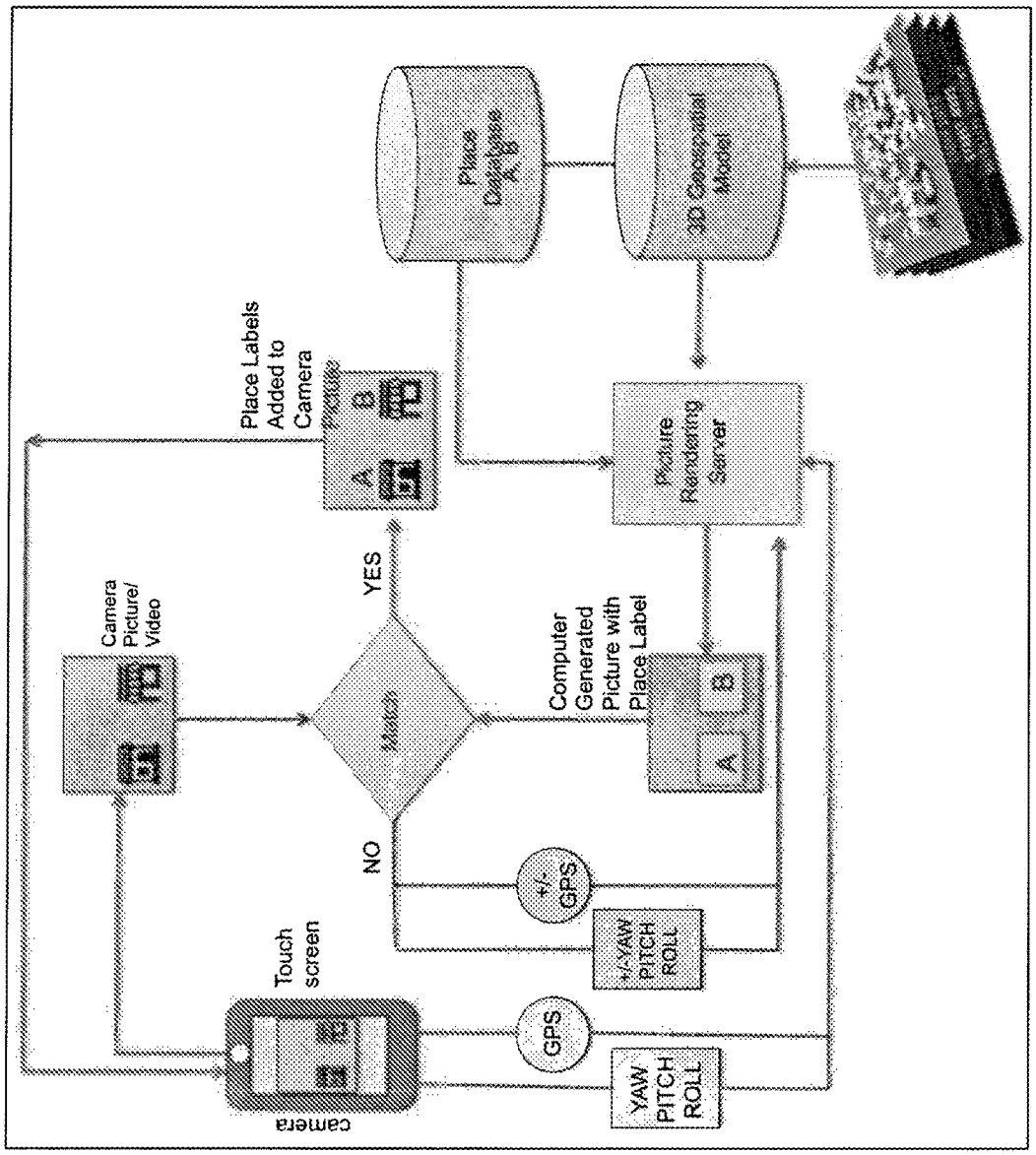
FIG. 2 shows a system and method to add place information through pictures according to an exemplary embodiment of the invention.

FIGS. 1 and 2 provide overview of a system that can be used to post and access place information directly through a camera viewfinder. FIG. 1 shows the acquisition of a picture or a video with a camera of a smartphone having a touchscreen. The smartphone concurrently acquires its own physical location and orientation information. A GPS sensor, or other location determining means, attached to the camera provides the location of the camera in a map coordinate system. The orientation of the camera includes the yaw, pitch, and roll and can be measured by, for example, by any of a gyroscope, accelerometer, or magnetometer, or combination thereof, attached to the camera. The presented system uses visual feature matching between camera's view and the computer-generated view of the location to estimate accurate location and orientation of the camera.

The smartphone is in communication with a picture rendering server and a place database. The picture rendering server is in further communication with a 3D geospatial model which is, in turn, in communication with a place database. The 3D geospatial model receives various inputs including, for example, LIDAR data, street maps, and satellite imagery. As shown, the picture rendering server uses the 3D model and the location and orientation information to produce a computer-generated picture that is compared with the picture or video acquired by the camera, and iteratively modifies that computer-generated picture until a match is determined. The place database consists of, for instance, names and relevant information including ratings, news, prices, user comments on local businesses, restaurants, retail shops, and other points-of-interest. The place database providing metadata to the 3D geospatial model. FIG. 2 shows the further addition of place labels added to the pictures or videos.

Figure 3:
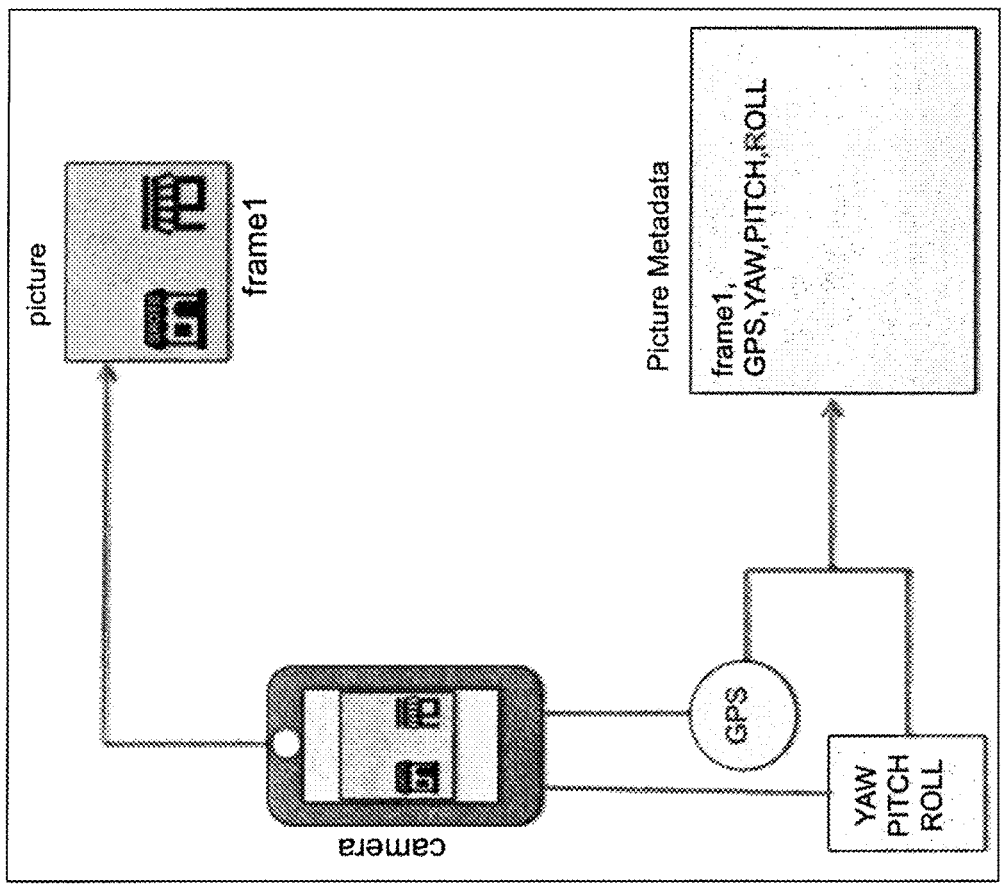
FIG. 3 shows an exemplary digital picture, GPS, and orientation sensors together providing input to the system according to an exemplary embodiment of the invention.
Figure 4:
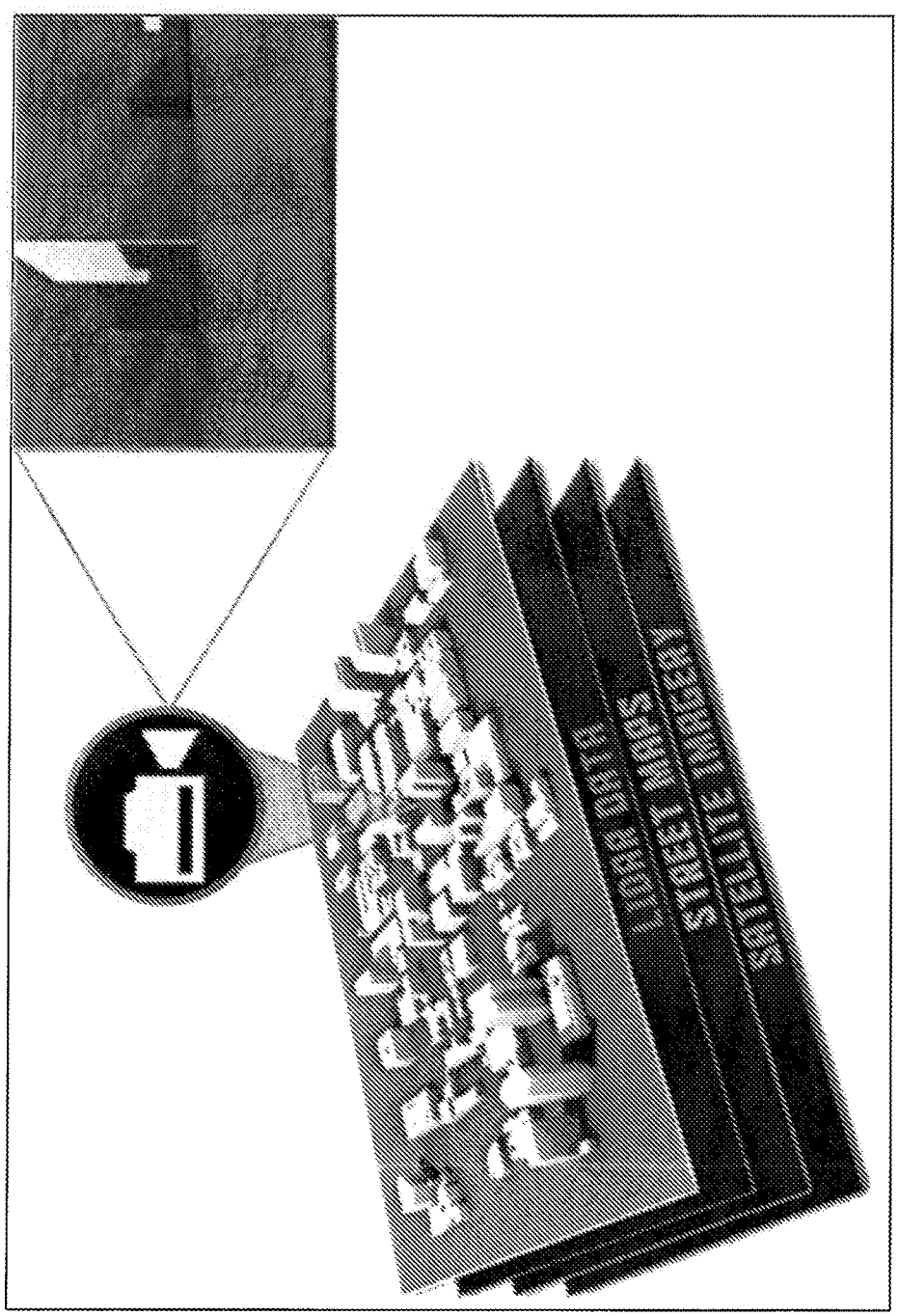
FIG. 4 shows a method using a virtual camera inside a 3D geospatial model to generate a synthetic image according to an exemplary embodiment of the invention.

FIG. 3 shows that the location and orientation of the camera, along with the picture, forms the input to the method. The location and orientation measurement is used to determine a placement of a virtual camera inside the 3D geospatial model. FIG. 4 shows a representation of the virtual camera inside the 3D geospatial model. The 3D geospatial model is composed of data from, for example, LIDAR, satellite imagery, terrain, and other maps. The virtual camera placed inside the 3D geospatial model produces synthetic (computer-generated) pictures that can be overlaid on the picture or video taken by the camera for enhancing and/or otherwise augmenting the user's camera view with digital information.

Figure 5:
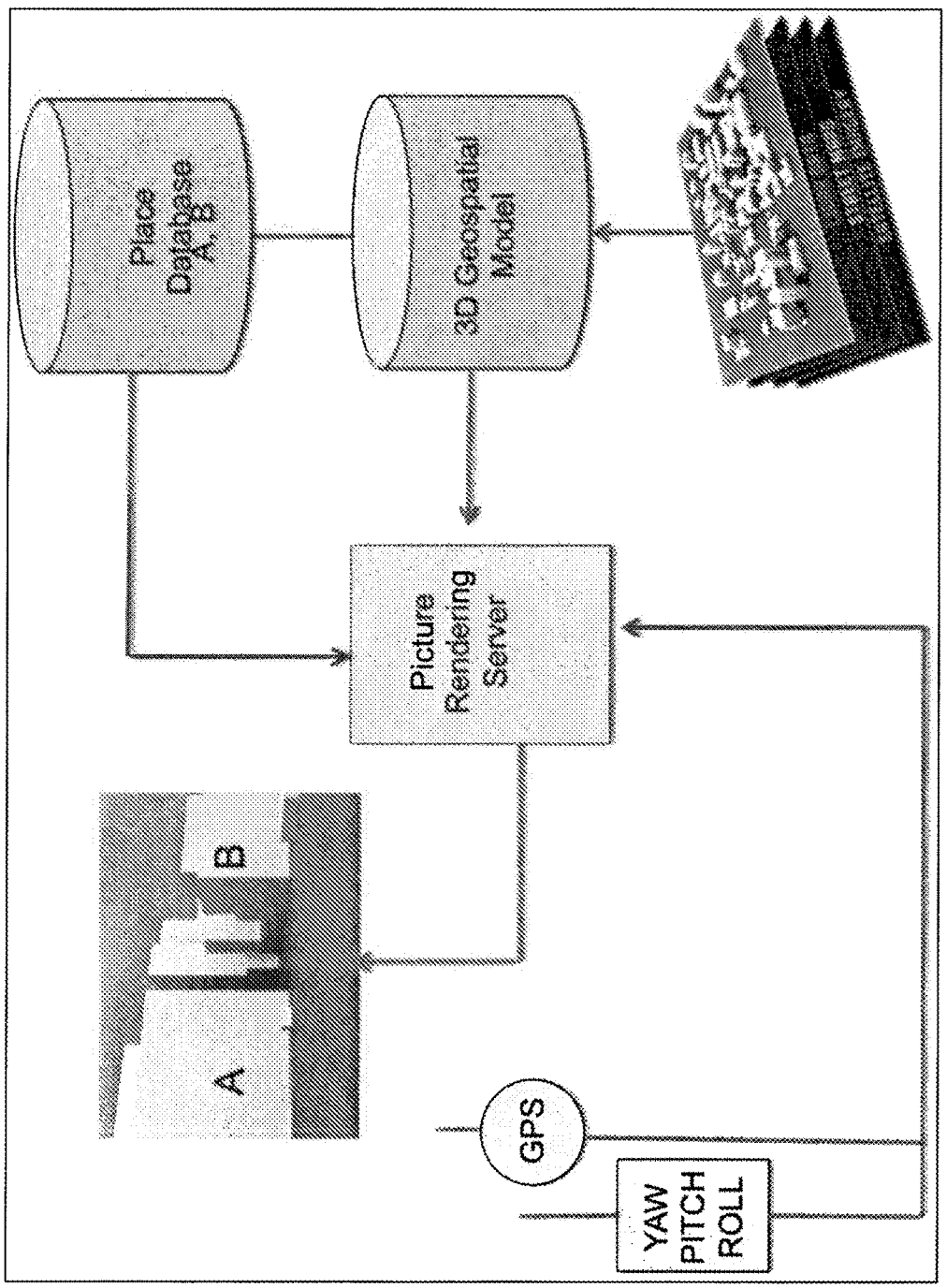
FIG. 5 shows a method using a 3D geospatial model and a place information database to generate a synthetic picture with place labels using a picture rendering server according to an exemplary embodiment of the invention.

FIG. 5 further shows an exemplary method to generate synthetic pictures using the 3D geospatial model. The virtual camera is implemented inside the picture rendering server as a software. The picture rendering server generates computer generated imagery using the 3D geospatial model using the camera location and orientation measurements as input. The place information contained in the place database is used to provide pixel labels to the computer-generated imagery.

Figure 6:
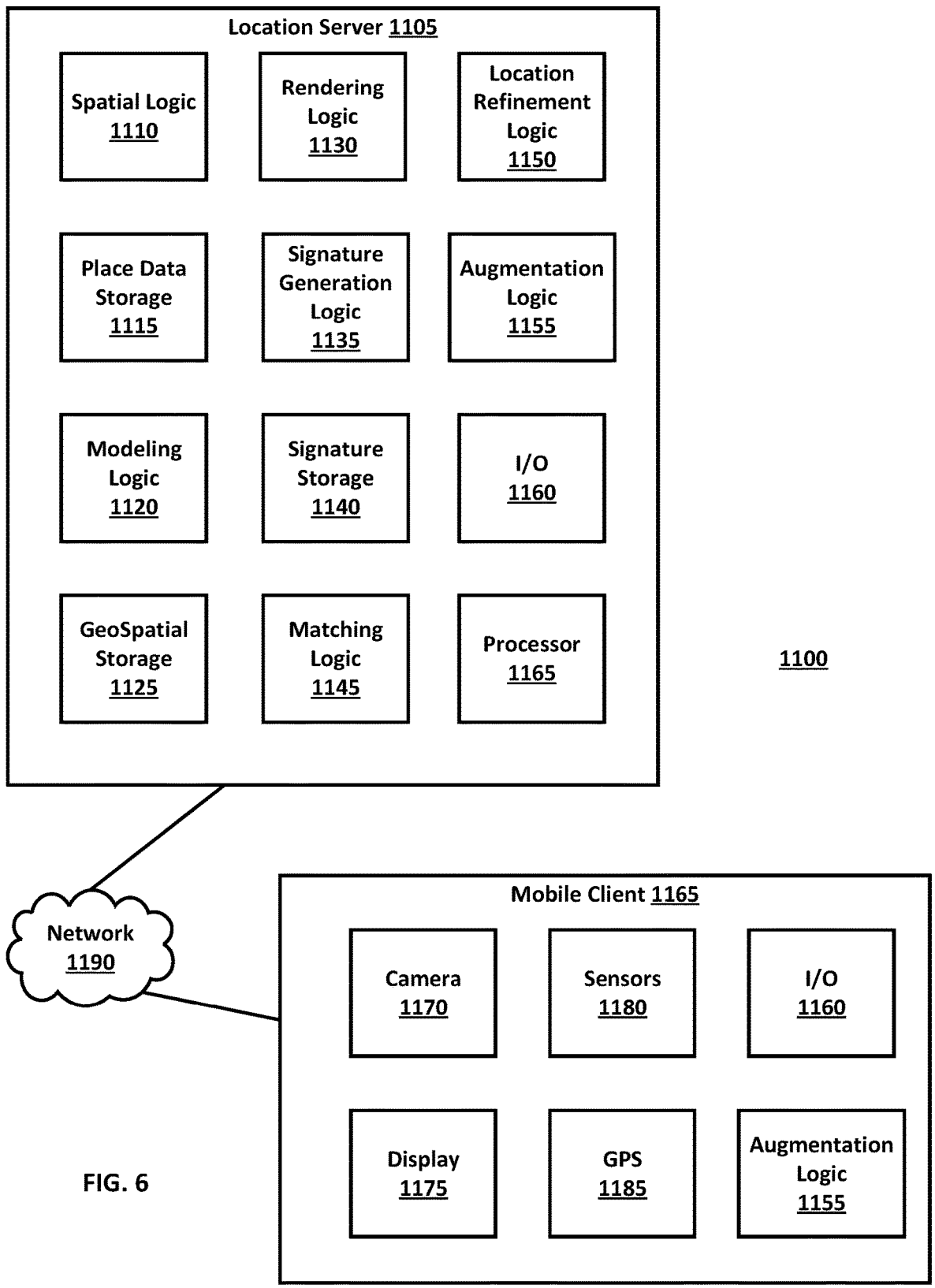
FIG. 6 is a block diagram of a location system, according to various embodiments of the invention.

FIG. 6 is a block diagram of a Location System 1100, according to various embodiments of the invention. Location System 1100 is configured to determine a location of a mobile device. Typically, this determination is made with accuracy and/or precision greater than can be accomplished using GPS capabilities of the mobile device alone. The determined location optionally includes a two or three-dimensional location and an orientation of the mobile device. Location System 1100 is optionally further configured to use determined locations in various ways. For example, to augment an image, navigate a vehicle or perform a search for information related to a location. Location System 1100 includes a Location Server 1105 and one or more Mobile Client 1165 connected by a Network 1190.

Location Server 1105 can include one or more computing devices, optionally disposed at a variety of different locations. Location Server 1105 includes a variety of components configured to receive an image from Mobile Client 1165 and to determine a location and orientation of Mobile Client 1165 based on the image. In various embodiments, Location Server 1105 is configured to first obtain an approximate location of Mobile Client 1165 based on GPS (Global Positioning System) data or other location data. One or more of the components included in Location Server 1105 are optionally disposed on Mobile Client 1165.

Network 1190 is a communication network configured for communication of digital data such as images. Network 1190 can include wired and/or wireless networks. In some embodiments, Network 1190 includes the internet and is configured to communicate using TCP/IP protocols. In some embodiments, Network 1190 includes a cellular network and/or a telephone network.

Mobile Client 1165 is a mobile device, such as a smartphone, tablet computer, wearable, augmented reality (AR) system, vehicle, robot, and/or the like. For example, in some embodiments Mobile Client 1165 includes a head mounted AR system configured to be worn by a user. In some embodiments, Mobile Client 1165 includes a vehicle including an AR system to be used by a driver or passenger.

As illustrated in FIG. 6, Location Server 1105 includes Spatial Logic 1110. Spatial Logic 1110 is configured to divide an area into units. For example, in some embodiments Spatial Logic 1110 is configured to divide an area into discrete cells. These can be on the order of 1×1; 2×2, 3×3 or 5×5 meters, or any range there between. Optionally the cells are smaller or greater than these dimensions. Alternatively, cells may be represented by a radius from a point or a set of vertices. In some embodiments, the size of a particular cell is dependent on its location and/or the complexity of its surroundings, e.g., cells in an empty desert may be larger than those in a city center.

Location Server 1105 further includes Place Data Storage 1115. Place Data Storage 1115 is configured to store the locations and/or sizes of cells identified using Spatial Logic 1110. Place Data Storage 1115 is thus configured through the use of appropriate data and/or file structures. Place Data Storage 1115 may be further configured to store geospatial data regarding an area such as satellite imagery, radar data, stereoscopic imagery, Wi-Fi data, maps, LIDAR data, building plans, street level imagery, and/or the like.

In some embodiments, Place Data Storage 1115 is managed using a database accessible via a query language. In some embodiments, the cells are configured to be searched (i.e. indexed) by location. For example, the spatial model may include GPS coordinates such that those cells close to a specific GPS coordinate are easily identified.

Location Server 1105 further includes Modeling Logic 1120. Modeling Logic 1120 is configured to generate a spatial model of an area based on geospatial data. This geospatial data can include, for example, any of the data stored in Place Data Storage 1115. The spatial model includes a three-dimensional representation of an area. For example, the spatial model can include a wire-frame model of part of a city including surfaces and edges of buildings, streets, sidewalks, poles, signs, and/or the like. This wire-frame model is optionally textured to represent actual surfaces within the modeled area. The spatial model of an area is optionally divided into cells as determined using Spatial Logic 1110.

Location Server 1105 further includes GeoSpatial Storage 1125. GeoSpatial Storage 1125 is configured to store the spatial model generated by Modeling Logic 1120, and/or a spatial model received from a third party. GeoSpatial Storage 1125 is thus configured through the use of appropriate data and/or file structures. In some embodiments, GeoSpatial Storage 1125 is managed using a database accessible via a query language. In some embodiments, the spatial model is configured to be searched (i.e. indexed) by cell identity and/or location. For example, the spatial model may include GPS coordinates such that those cells close to a specific GPS coordinate are easily identified.

Location Server 1105 further includes Rendering Logic 1130. Rendering Logic 1130 is configured to generate a two or three-dimensional rendering of the 3D spatial model generated by Modeling Logic 1120. The rendering is based on a specific viewpoint and includes features such as corners, edges and surfaces visible from the viewpoint. As used herein, the term "viewpoint" is meant to mean a view from a particular location, in a particular direction (line of sight) and a particular angle of view. The location may be identified in three dimensions or on a two dimensional grid. The direction may be identified in Cartesian, polar or cylinder coordinates; and/or as a vector. The angle of view describes the angular extent of a scene that is visible in a given view. For example, the angle of view may be determined by the focal length of a lens and an aperture.

Typically, Rendering Logic 1130 is configured to determine which parts of a three-dimensional model are visible from a specific viewpoint. Thus, those parts of a three-dimensional model that are visible are distinguished from those that are not visible; and the locations of visible features as seen from the viewpoint are identified. These locations typically correspond to locations within a simulated image of a scene, e.g., a corner may be found at a simulated image pixel (X,Y).

Rendering Logic 1130 is further configured to generate simulated images of the rendered environment. These simulated images are generated by selecting one or more location within each cell and then determining what would be seen at a variety of viewpoints from that location. For example, the location may be at the center of each cell and at an elevation of 5 feet. From that location, a series of images at different viewpoints are generated. These viewpoints can be at different angles in spherical coordinates ($\theta$, $\varphi$) such that a sampling of viewpoints over a hemisphere are obtained. Specifically, $\theta$ may be varied from 0 to 180 degrees while $\varphi$ is varied from 0 to 360 degrees to generate images at least 64, 128, 256 or 512 viewpoints. The images are optionally rendered with color and depth information and have dimensions 360 (height)×640 (width) pixels or 720 (height)×1280 (width) pixels.

Location Server 1105 further includes Signature Generation Logic 1135. Signature Generation Logic 1135 is configured to generate image signatures for specific locations. The specific location may be represented by a specific cell in a two or three-dimensional array as determined by Spatial Logic 1110. The image signatures are sets of data configured to distinguish different images from each other. Specifically, image signatures are configured to discriminate between images that match and images that don't match. Wherein matching is an indication that the images are from the same location and point of view. Image signatures optionally include multiple elements, each element representative of a different part of an image. In various embodiments, signatures include at least 32, 64, 128, 256 or 512 elements, or any range there between. In various embodiments, each of signatures elements each includes 2, 4, 6 or 8 bytes of data. In one embodiment, each part of the image includes a 128×128 pixel patch.

Signature Generation Logic 1135 optionally includes a machine learning system, such as a deep learning neural network, or other artificial intelligence. The machine learning system is trained to select parts of images to be represented by signature elements, and/or to generate signature elements based on the selected parts. The machine learning system is optionally trained to select parts of images including features such as edges, corners, curves, and/or other shapes. A goal of this training may be to generate signatures that best distinguish images.

In alternative embodiments, Signature Generation Logic 1135 is configured to select parts of an image based on a set of rules. For example, the parts of an image from which signature elements are generated may be selected (in preference) as 1) those parts having corners, 2) those parts having edges, 3) those parts having curves, 4) those parts having high contrast, 5) those parts having unusual shapes, 6) those parts having specific colors or color changes, etc.

Once selected, each part of the image is encoded into an element of an image signature. This encoding may be performed by a machine learning system included in Signature Generation Logic 1135. Again, the machine learning system may be trained by providing sets of image signatures representing matching and non-matching images.

Signature Generation Logic 1135 is typically configured to generate image signatures from both images captured using a camera and simulated images generated using Rendering Logic 1130. Typically, signatures for some simulated images are generated a priori for storage in a library of signatures, while signatures for camera generated images are generated as needed in response to receiving the image from Mobile Client 1165.

Spatial Logic 1110, Place Data Storage 1115, Modeling Logic 1120, GeoSpatial Storage 1125, and/or Rendering Logic 1130 are optional in various embodiments. For example, in some embodiments, signatures of simulated images are generated and provided by a third party. In these embodiments, Modeling Logic 1120 and Rendering Logic 1130 are not required to be a part of Location Server 1105.

Location Server 1105 further includes a Signature Storage 1140. Signature Storage 1140 is configured to store image signatures, such as those generated using Signature Generation Logic 1135. Signature Storage 1140 is thus configured through the use of appropriate data and/or file structures. In some embodiments, Signature Storage 1140 is managed using a database accessible via a query language. For example, simulated image signatures may be stored in a database and indexed by location (i.e., GPS location or cell identity) and/or viewpoint at which the associated simulated image was generated.

Location Server 1105 further includes Matching Logic 1145. Matching Logic 145 is configured to receive a signature of a camera generated image (a "camera image") and to search Signature Storage 1140 for one or more signatures of simulated images that best match the signature of the camera generated image. The camera image may be part of a video. Optionally, Matching Logic 145 is configured to first receive geolocation information, such as GPS data, and to use this data to select which simulated image signatures to compare with the signature of the camera image. Specifically, Matching Logic 145 may use the GPS data as part of a query to select simulated image signatures associated with locations near a location indicated by the GPS data. As such, the GPS data is used to narrow the set of simulated image signatures to be compared with the camera image signature. In various embodiments, GPS data may be used to narrow the set of simulated images to be compared to less than 18000, 36000, 72000 or 144000 signatures, or any range therebetween. This is a substantial reduction from 24,000,000,000 simulated image signatures that may be used to represent an entire city.

Further, sensor data indicative of an orientation of Mobile Client 1165 is optionally used to reduce the number of simulated image signatures searched. This sensor data can include the pitch, yaw, and/or elevation of Mobile Client 1165. For example, sensors on Mobile Client 1165 may indicate that a camera of Mobile Client 1165 is pointed in a direction characterized by spherical coordinates (θ, φ) of (45,120) relative to true north. Using this data, Matching Logic 1145 may limit the simulated image signatures searched to those whose associated image had a viewpoint at or close to this angle. In one embodiment, only those simulated image signatures generated from a simulated image having a viewpoint of θ=40-50 degrees and φ=110 to 130 degrees. Again, this can result in a substantial reduction of the simulated image signatures to be searched.

Matching Logic 1145 can include statistical analysis logic configured to use a rules based system to calculate a match value between image signatures. Alternatively, Matching Logic 1145 can include a machine learning system trained to distinguish matching from non-matching pairs of images based on their respective signatures. The machine learning system is optionally trained by providing sets signatures of matching and non-matching images. In either case, Matching Logic 1145 may be configured to return one or more of the simulated image signatures that best match a camera image signature. Typically, the camera image is assumed to have been taken from the location from which the best matched simulated image signature was generated. This location is then known to approximately one cell size, e.g. to within a 3×3 meter cell. Specifically, the best matched simulated image signature may be associated with a specific GPS location or cell location. Mobile Client 1165 is assumed to be located at this GPS location or cell location when the camera image was captured.

Location Server 1105 optionally further includes Location Refinement Logic 1150. Location Refinement Logic 1150 is configured to further improve the accuracy and/or precision of the location of Mobile Client 1165. For example, if the location determined by Matching Logic 1145 is determined to be within a 3×3 or a 2×2 meter cell, then Location Refinement Logic 1150 is configured to refine this location to a smaller area. In various embodiments, Refine Location Logic 1150 is configured to refine the location of Mobile Client 1165 to within +/−1, 2 or 3 feet.

In contrast with Matching Logic 1145, Location Refinement Logic 1150 is optionally configured to determine location based on direct comparison of camera images and simulated images, rather than comparison of the respective image signatures. Further, Location Refinement Logic 1150 may be configured to use Modeling Logic 1120 and/or Rendering Logic 1130 to generate new simulated images, if an available simulated image does not match a camera image to a sufficient precision.

For example, Location Refinement Logic 1150 may be configured to directly compare one or more simulated images to a camera image using any of a wide variety of known image comparison algorithms. For example shape matching at several key pixel locations can be used to find the match between camera and simulated image to refine location. Several simulated images at different locations and/or viewpoints, within a particular cell, may be compared to the camera image. The location and/or viewpoint of the best matching simulated image can be assumed to best represent the actual location and orientation of Mobile Client 1165. An iterative optimization approach may be used to produce simulated images based on new locations and/or viewpoints similar to the current best match in order to further refine the location and/or viewpoint of Mobile Client 1165. This process may continue until a time limit is reached or a minimum difference between camera and simulated images is achieved. Location Refinement Logic 1150 may use the systems and methods described elsewhere herein to further refine location estimates.

The location and orientation determined by Matching Logic 1145 and/or Location Refinement Logic 1150 is optionally communicated to Mobile Client 1165 via Network 1190.

Location Server 1105 optionally further includes Augmentation Logic 1155. Augmentation Logic 1155 is configured to augment an image based on a location and orientation of Mobile Client 1165. In some embodiments, Augmentation Logic 1155 is configured augment the camera image received from Mobile Client 1165. The augmentation may further be based on a three-dimensional model of the environment at the determined (e.g., estimated) location of Mobile Client 1165 as determined by Modeling Logic 1120.

For example, in some embodiments, Augmentation Logic 1155 is configured to add an object to the camera image such that the object fits properly into the content of the camera image. This can include placement of a virtual object or animation on a surface within the environment around Mobile Client 1165. Because the location and orientation of Mobile Client 1165 is well known using the systems and methods described herein, the placement can be made accurately yielding a preferred effect. In a specific example, a virtual avatar may be placed on a sidewalk (within an image), the location of the sidewalk being identified in the three-dimensional model and the proper placement of the avatar being based on the determined location and orientation of Mobile Client 1165. Augmentation Logic 1155 can be configured to overlay a rendered image of the of the location as seen from the location and orientation measurements provided by Location Refinement Logic 1150, over the camera image such a way that certain parts or pixels of the camera image can be made transparent to show the rendering image at those pixel locations giving user a simulated x-ray view effect of seeing world through occlusions. Augmentation Logic 1155 can also be configured to overlay rendering image of the building interiors over the street side camera view of the building giving user ability to locate different parts of the building interior.

Location Server 1105 further includes an I/O 1160. I/O 1160 includes input/output hardware configured to communicate with Mobile Client 1165 via Network 1190. I/O 1160 can include, for example, a wireless communication device, a router, a switch, a communication hub, a serial port, an Ethernet port, and/or the like. I/O 1160 may be configured to receive a camera image, sensor data, and/or GPS data from Mobile Client 1165, to send a determined location to Mobile Client 1165, and/or to send an augmented image to Mobile Client 1165.

Location Server 1105 further includes at least one Processor 1165. Processor 1165 is a digital processor (e.g., electronic circuit) configured to execute logic included within Location Server 1105. For example, Processor 1165 may be configured to execute Signature Generation Logic 1135, Matching Logic 1145, and/or Augmentation Logic 1155.

Mobile Client 1165 includes a Camera 1170 configured to capture images. In some embodiments, Camera 1170 is under the control of an image augmentation application configured to provide augmented instances of the captured images. Camera 1170 can, for example include a camera of a smartphone, tablet computer or wearable device. In some embodiments, Camera 1170 includes more than one optical detection path configured to generate stereoscopic or three-dimensional images. In these embodiments, the stereoscopic or three-dimensional images may be used by Matching Logic 1145 and/or Location Refinement Logic 1150 to identify a location and/or orientation of Camera 1170.

Mobile Client 1165 typically includes a Display 1175. Display 1175 is configured to display images captured by Camera 1170 and/or images augmented using Augmentation Logic 1155.

Mobile Client 1165 optionally includes Sensors 1180. Sensors 1180 are configured to determine an orientation of Mobile Client 1165 (and thus Camera 1170). Sensors 1180 can include accelerometers, a barometer, a compass, a gyroscope, and/or the like. In some embodiments, Sensors 1180 include LIDAR or radar system.

Mobile Client 1165 optionally includes a GPS 1185. GPS 1185 is a global or local positioning system. For example, GPS 1185 can include radio frequency receivers and timing electronics configured to determine position from satellite signals.

Mobile Client 1165 includes an instance of I/O 1160 configured to communicate with Location Server 1105 via Network 1190.

Mobile Client 1165 optionally includes any of the various logic and storage described herein as being included in Location Server 1105. As noted herein, these elements of Location Sever 1105 can be distributed among more than one discrete devices, including one or more instances of Mobile Client 1165. For example, all or part of Augmentation Logic 1155 may be disposed on Mobile Client 1165. In this case, Mobile Client 1165 receives a location estimate generated by Matching Logic 1145 and/or Location Refinement Logic 1150. This location is then used by Augmentation Logic 1155 to augment an image captured by Camera 1170, the augmentation occurring on Mobile Client 1165.

Figure 7:
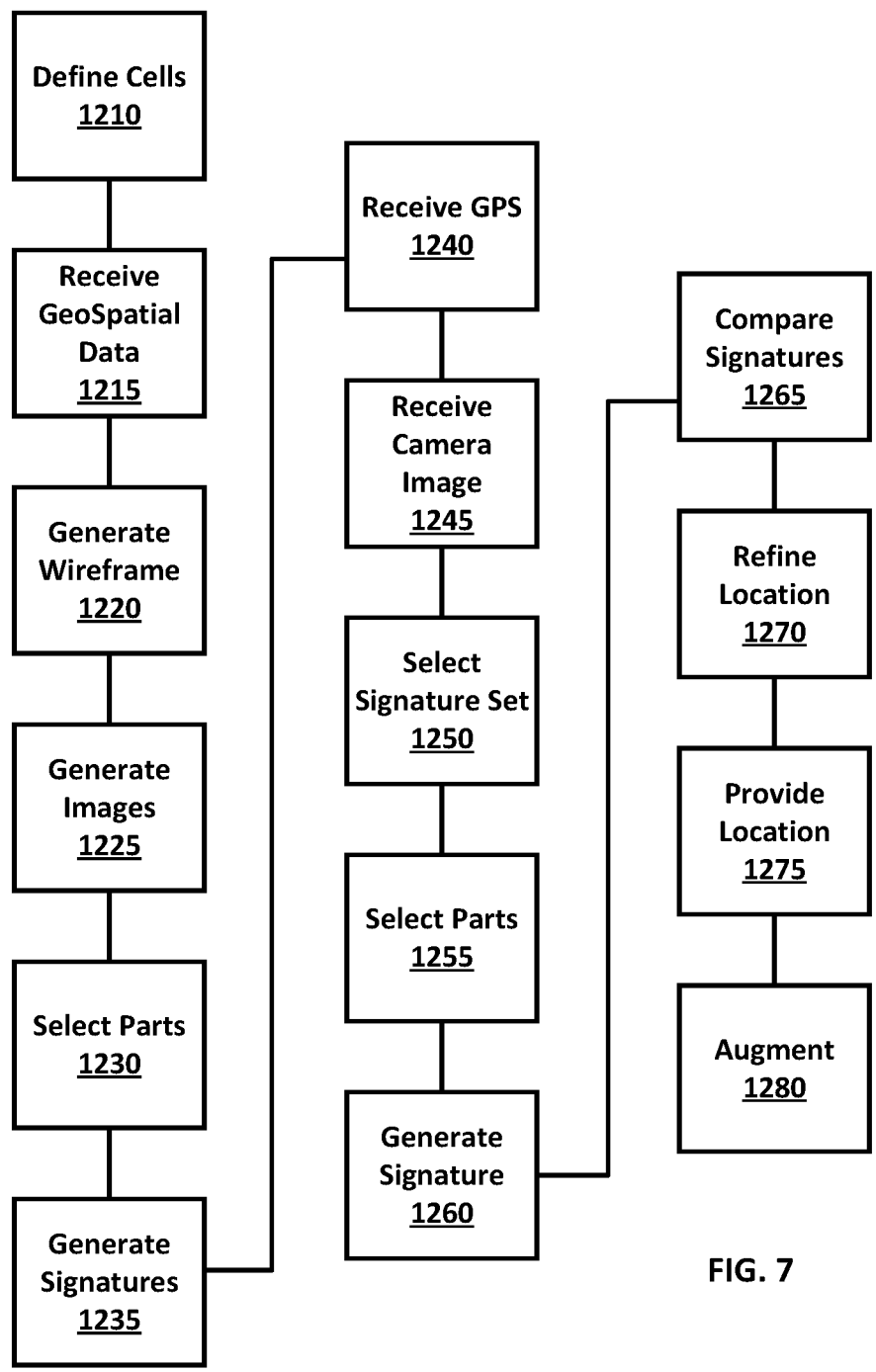
FIG. 7 illustrates methods of determining and/or using location information, according to various embodiments of the invention.

FIG. 7 illustrates methods of determining and/or using location information, according to various embodiments of the invention. The methods illustrated in FIG. 7 are optionally performed using the systems disclosed elsewhere herein, for example by the system illustrated in FIG. 6. The steps illustrated in FIG. 7 are optionally performed in different orders, on different devices and/or by different parties.

In summary, the methods illustrated in FIG. 7 include generating a virtual representation of an area. The area can include a city or county or other geopolitical region. This representation is used to generate simulated images of the area and the simulated images are then used to generate simulated image signatures. The simulated image signatures are configured to be efficiently compared with image signatures of images obtained from a camera. The number of images to be compared is optionally reduced by selecting those simulated image signatures representing locations near an estimated location of the camera and/or based on an estimated viewpoint. The estimated location of the camera may be based on GPS data, Wi-Fi data, and/or the like. The estimated viewpoint may be based on sensors within a mobile device including the camera.

A match between a simulated image signature and a camera image signature is used to determine an estimated location and viewpoint of the camera. This determination is optionally further refined by comparing simulated images and camera images. The determined location and viewpoint are optionally used to augment one or more images captured using the camera.

In a Define Cells Step 1210 an area is divided up in to cells, optionally using Spatial Logic 1110. The cells may have a variety of shapes and may be represented by vertices or distances from a grid of points. As noted elsewhere herein, the cells may cover a geographic region such as a city or town.

In a Receive GeoSpatial Data Step 1215 geospatial data is received. The geospatial data can include satellite imagery, maps, etc. as described elsewhere herein. In some embodiments, the geospatial data includes identifiers and locations of Wi-Fi signals.

In a Generate Wireframe Step 1220 a three dimensional wireframe is generated based on the geospatial data. The wireframe represents surfaces, edges and corners within the area and is optionally generated using Modeling Logic 1120. For example, the wireframe may represent the structures of buildings and other objects within a city. The wireframe is optionally textured to represent surface appearances.

In a Generate Images Step 1225, a plurality of simulated images is generated based on the wireframe generated in Generate Wireframe Step 1220. Typically, a plurality of simulated images is generated for each cell or location, each of the plurality being characterized by a different viewpoint. Generate Images Step 1225 is optionally performed using Rendering Logic 1130. As noted elsewhere herein, the viewpoints at which images are generated are optionally selected to cover a hemisphere around the cell or location.

In a Select Parts Step 1230, parts of each of the plurality of simulated images are selected. The parts are optionally selected to include distinguishing features of each of the simulated images. For example, parts including edges, corners, and/or specific shapes. The shapes can include object shapes, e.g., an arch or bridge, or symbols such as a logo, trademark, letters and numbers.

In a Generate Signatures Step 1235, Signature Generation Logic 1135 is used to generate simulated image signatures. These simulated image signatures include signature elements corresponding to each of the parts of the simulated images as selected in Select Parts Step 1230. For example, if 128 parts of a particular simulated image are selected in Select Parts Step 1230, then a simulated image signature including 128 elements may be generated from that simulated image.

The encoding of part of an image into an element of an image signature may be accomplished using a variety of alternative approaches. In some embodiments a trained machine learning system is used to generate a numerical signature element from pixel data. This machine learning system may be trained using image parts with particular features and a goal of distinguishing between these features. The features can include symbols, corners, angles, edges, patterns, shading, color, and/or the like. In some embodiments, image feature detection systems are used to encode the parts of the image element. For example, scale-invariant feature transform (SIFT) is method to detect and describe local features in images.

Select Parts Step 1230 and Generate Signatures Step 1235 are optionally performed using Signature Generation Logic 1135.

Define Cells Step 1210 through Generate Signatures Step 1235 are optional in embodiments in which simulated image signatures are received from a third party or otherwise obtained.

In a Receive GPS Step 1240, GPS data is received at Location Server 1105 from Mobile Client 1165. The GPS data is optionally generated by GPS 1185 on Mobile Client 1165. The received GPS data is configured to determine a location of Mobile Client 1165. In alternative embodiments, the data from which an initial location is determined may be Wi-Fi hotspot identifier, or an address manually entered by a user, and/or other location data. This alternative data may be used in addition to or as an alternative to GPS data.

In a Receive Camera Image Step 1245 at least one camera image is received at Location Server 1105 from Mobile Client 1165. This image is typically generated using Camera 1170. Receive Camera Image Step 1245 optionally further includes receiving orientation information regarding the orientation of Camera 1170 at the time the image was generated. This orientation may be determined by Sensors 1180. In some embodiments, Receive Camera Image Step 1245 includes receiving multiple images each possibly being associated with a different orientation. Receive GPS Step 1240 and Receive Image Step 1245 are optionally performed as part of a single communication from Mobile Client 1165 to Location Server 1105.

In a Select Signature Set Step 1250, a set of simulated image signatures are selected using Matching Logic 1145. The set of simulated image signatures is selected to include those simulated image signatures stored in Signature Storage 1140 most likely to be good matches with signature(s) of the one or more camera images received in Receive Camera Image Step 1245. The selection may be based on the GPS data (or other location identifying data) received in Receive GPS Step 1240, which identifies a location. For example, simulated image signatures based on simulated images generated from a virtual model of a location near the identified location may be selected. Specifically, if the GPS data identifies a location at a corner of $1^{st}$ and Main streets, then the set of simulated image signatures selected may include those generated based on a virtual model of this location and within 50 meters of the corner. This approach to selection of a set of simulated image signatures is intended to reduce the total number of simulated image signatures that need to be compared with a camera image signature to find a match, while also selecting those simulated image signatures most likely to result in a good match.

In a Select Parts Step 1255 parts of the camera image(s) received in Receive Camera Image Step 1245 are selected. Select Parts Step 1255 is otherwise similar to Select Parts Step 1230. For example, in some embodiments 128 parts are selected based on shapes, corners, and/or edges within these parts. The parts are selected to best distinguish the camera image(s) from simulated images.

The signatures from the simulated or rendering image are stored with positional data to ensure that the signatures extracted from different parts of the camera image can be compared with the corresponding stored signatures.

In a Generate Signature Step 1260, one or more camera image signatures are generated for the camera images received in Receive Camera Image Step 1245. These generated camera images include signature elements corresponding to the image parts selected in Select Parts Step 1255. Generate Signature Step 1260 is optionally performed using Signature Generation Logic 1135.

In a Compare Signatures Step 1265, the one or more camera image signatures generated in Generate Signature Step 1260 are compared to the simulated image signatures selected in Select Signature Set 1250. A result of the comparison is to identify those simulated image signatures that best match the one or more camera image signatures.

The location and viewpoint associated with the best matching simulated image signature(s) are then assumed to be the location and orientation of Mobile Client 1165. Compare Signatures Step 1265 is optionally performed using Matching Logic 1145.

In an optional Refine Location Step 1270, the location and/or orientation of Mobile Client 1165, as assumed (e.g., estimated) in Compare Signatures Step 1265, is further refined. The further refinement is optionally based on directly comparing images rather than comparing image signatures. These comparisons may be between the one or more images received in Receive Camera Image Step 1245 and stored simulated images. Alternatively, these comparisons may be between the one or more images received in Receive Camera Image Step 1245 and new simulated images generated using a repetition of Generate Images Step 1225 and/or Rendering Logic 1130. Comparisons of camera images and simulated images may be repeated in an iterative process, in which new simulated images are optionally produced, until a match of satisfactory quality is achieved. Refine Location Step 1270 serves to increase the precision and/or accuracy of the estimate of the location of Mobile Client 1165. For example, the accuracy may be improved from an area within a particular cell to less than 1, 2 or 3 feet. Refine Location Step 1270 is optionally performed using the systems and methods described elsewhere herein and/or in U.S. patent application Ser. No. 15/155,867 filed May 16, 2016.

In an optional Provide Location Step 1275 the location of Mobile Client 1165 estimated in Compare Signatures Step 1265 or Refine Location Step 1270 is provided to Mobile Client 1165 and/or a third party.

In an optional Augment Step 1280 an image is augmented based on the location of Mobile Client 1165 estimated in Compare Signatures Step 1265 or Refine Location Step 1270. The augmented image may be one of the one or more images received in Receive Camera Image Step 1245. The augmentation can include modification the image, addition of a real or virtual object to the image, removal of content from the image, and/or the like. For example, the augmentation can include addition of an object to the image at a location based on the wireframe generated in Generate Wireframe Step 1220 and/or based on the location determined in Compare Signatures Step 1265 or Refine Location Step 1270. Augment Step 1280 is optionally performed using Augmentation Logic 1155 on Location Server 1105, Mobile Client 1165, and/or some other system.

Several embodiments are specifically illustrated and/or described herein. However, it will be appreciated that modifications and variations are covered by the above teachings and within the scope of the appended claims without departing from the spirit and intended scope thereof. For example, in some embodiments Mobile Client 1165 includes a vehicle having multiple cameras. In these embodiments, the systems and methods described herein may be included as part of a vehicle navigation and/or vehicle self-driving system to support active sensing technologies such as terrestrial LIDAR Existing terrestrial LIDAR systems can measure distance to street structures that are within 60-100 meters. The systems and methods described here can be valued as supporting systems that are effective when the targeted street structures used to localize the vehicle are beyond the scanning range of terrestrial LIDAR systems. Furthermore, by enhancing the camera view with night vision technologies the presented system can provide localization support day and night The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. The "storage" disclosed herein can comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of "logic" noted comprise hardware, firmware, or software stored on a non-transient computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

What is claimed is:

1. A location system comprising:
    an I/O configured to receive a camera image from a mobile client, the camera image being generated using a camera;
    signature storage configured to store a plurality of simulated image signatures, each of the simulated image signatures being associated with a location and a viewpoint;
    signature generation logic configured to generate an image signature of the camera image;
    matching logic configured to determine a location of the camera within an area by comparing the image signature of the camera image to the plurality of simulated image signatures;
    location refinement logic configured to determine a more accurate location, the more accurate location being more accurate relative to the location determined by the matching logic;
    augmentation logic configured to augment the camera image based on the more accurate location and a wireframe model of the more accurate location; and
    a processor configured to execute at least the signature generation logic.

2. The system of claim 1, wherein the location refinement logic is configured to determine the more accurate location by comparing the camera image to members of a plurality of simulated images, the members of the plurality of simulated images being selected based on the location determined by the matching logic.

3. The system of claim 1, further comprising:
modeling logic configured to generate a spatial model of the area based geospatial data, the spatial model including a three-dimensional representation of the area; and
rendering logic configured to generate simulated images based on the three-dimensional representations, and
wherein the signature generation logic is further configured to generate the plurality of simulated image signatures based on the simulated images.

4. The system of claim 3, wherein the area is divided into cells and the modeling logic is configured to generate multiple simulated images having different viewpoints from within each of the cells.

5. The system of claim 1, further comprising spatial logic configured to divide the area into cells, each of the plurality of simulated image signatures being associated with at least one of the cells.

6. The system of claim 1, wherein the signature generation logic is configured to generate the image signature of the camera image using a machine learning system.

7. The system of claim 1, wherein the matching logic is configured to select a subset of the plurality of simulated image signatures for comparison with the signature of the camera image based on location data received from the mobile client.

8. The system of claim 1, wherein the matching logic is configured to select a subset of the plurality of simulated image signatures for comparison with the signature of the camera image based on orientation data received from the mobile client.

9. A method determining a location, the method comprising:
receiving location information representative of a location of a mobile device; receiving a camera image from the mobile device;
selecting a set of simulated image signatures based on the location information, each of the simulated image signatures being associated with a location;
generating a camera image signature of the camera image;
comparing the camera image signature with the set of simulated image signatures, to determine a best matching simulated image signature;
assuming the location of the mobile device to be the location associated with the best matching simulated image signature; and
augmenting an image based on the assumed location and a wireframe model of the assumed location.

10. The method of claim 9, further comprising receiving orientation information representative of a viewpoint of a camera of the mobile device, the viewpoint being at a time the camera image was generated.

11. The method of claim 10, wherein the set of simulated image signatures is selected further based on the orientation information.

12. The method of claim 9, further comprising refining the assumed location by comparing the received camera image to simulated images.

13. The method of claim 9, wherein the augmented image is the received camera image.

14. The method of claim 9, further comprising generating the simulated image signatures based on geospatial data.

15. The method of claim 9, wherein the location information includes GPS data.

16. The method of claim 9, wherein the mobile device includes a vehicle.

17. The method of claim 9, wherein each of the simulated image signatures include multiple signature elements each representing a different part of a simulated image.

18. The method of claim 9, wherein generating an image signature of the camera image includes determining different signature elements for different parts of the camera image.

19. A method of augmenting an image, the method comprising:
generating a plurality of simulated images, each of the simulated images being associated with a different location;
generating a simulated image signature for each of the simulated images;
receiving a location of a mobile device;
receiving an image generated by the mobile device;
generating a camera image signature of the received image;
selecting a subset of the simulated image signatures based on the received location of the mobile device;
comparing the camera image signature to each simulated image signature of the subset, to find a best matching simulated image signature;
assuming that the location associated with the best matching simulated image signature is the location of the mobile device;
refining the assumed location by comparing the received image to one or more simulated images; and
augmenting the received image based on the refined location, wherein the augmentation is further based on a wireframe model of an area including the location of the mobile device.

20. The method of claim 19, wherein the subset of the simulated image signatures is selected further based on orientation data received from the mobile device.

21. The method of claim 19, wherein the augmentation of the received image includes adding a digital object to the received image.

22. The method of claim 19, wherein the received image is used to access information associated with the place shown in the image, after location refinement.

23. The method of claim 19, wherein the received image is used to access information associated with the place shown in the image by identifying the place on the camera view through gestures, after location refinement.

24. The method of claim 19, wherein the received image is used to search for place information with the image, after location refinement.

25. The method of claim 19, wherein the received image is used to measure distance to local surroundings from the camera after location refinement.

26. The method of claim 19, wherein the received image after location refinement is used to input data to geospatial database directly through the image after location refinement.

* * * * *